(12) United States Patent
Fleury et al.

(10) Patent No.: US 8,893,339 B2
(45) Date of Patent: Nov. 25, 2014

(54) SYSTEM AND METHOD FOR ADJUSTING SETTINGS OF A BED WITH A REMOTE CONTROL

(71) Applicants: Joe Fleury, Woodbury, MN (US); Mark Dickens, Franklin, TN (US)

(72) Inventors: Joe Fleury, Woodbury, MN (US); Mark Dickens, Franklin, TN (US)

(73) Assignee: Select Comfort Corporation, Minneapolis, MN (US)

( * ) Notice: Subject to any disclaimer, the term of this patent is extended or adjusted under 35 U.S.C. 154(b) by 0 days.

(21) Appl. No.: 14/206,892

(22) Filed: Mar. 12, 2014

(65) Prior Publication Data

US 2014/0259431 A1    Sep. 18, 2014

Related U.S. Application Data

(60) Provisional application No. 61/785,397, filed on Mar. 14, 2013.

(51) Int. Cl.
*A47C 27/08* (2006.01)
(52) U.S. Cl.
CPC .................................... *A47C 27/083* (2013.01)
USPC ................. 5/713; 5/706; 5/707; 5/710; 5/727
(58) Field of Classification Search
CPC .................. A47C 27/08–27/084; A47C 27/10
USPC ............ 5/600, 613, 614, 615, 689, 690, 697, 5/706, 707, 710, 713, 727
See application file for complete search history.

(56) References Cited

U.S. PATENT DOCUMENTS

| | | | |
|---|---|---|---|
| 5,848,450 A | 12/1998 | Oexman et al. | |
| 6,008,598 A | 12/1999 | Luff et al. | |
| 6,079,065 A * | 6/2000 | Luff et al. | 5/618 |
| 6,378,152 B1 | 4/2002 | Washburn et al. | |
| 6,396,224 B1 | 5/2002 | Luff et al. | |
| 6,560,492 B2 | 5/2003 | Borders | |
| 6,686,711 B2 | 2/2004 | Rose et al. | |
| 6,709,246 B2 | 3/2004 | Boyd | |
| 6,763,541 B2 * | 7/2004 | Mahoney et al. | 5/713 |
| 6,789,284 B2 | 9/2004 | Kemp | |
| 7,346,944 B2 | 3/2008 | Shaw | |
| 7,429,979 B2 * | 9/2008 | Mears et al. | 345/172 |
| 7,805,785 B2 | 10/2010 | Rawls-Meehan | |
| 7,852,208 B2 | 12/2010 | Collins, Jr. et al. | |
| 7,962,981 B2 | 6/2011 | Lemire et al. | |
| 7,979,169 B2 | 7/2011 | Rawls-Meehan | |
| 8,031,057 B2 | 10/2011 | McNeely et al. | |
| 8,050,805 B2 | 11/2011 | Rawls-Meehan | |
| 8,090,478 B2 | 1/2012 | Skinner et al. | |
| 8,117,701 B2 | 2/2012 | Bobey et al. | |
| 8,162,009 B2 | 4/2012 | Chaffee | |
| 8,181,290 B2 | 5/2012 | Brykalski et al. | |
| 8,413,278 B2 * | 4/2013 | Chaffee | 5/713 |
| 8,430,458 B2 * | 4/2013 | Kaminski et al. | 303/7 |

(Continued)

*Primary Examiner* — Robert G Santos
*Assistant Examiner* — David E Sosnowski
(74) *Attorney, Agent, or Firm* — Fish & Richardson P.C.

(57) ABSTRACT

A method may include presenting a user interface on a display of a remote control to label a first air chamber of a plurality of air chambers; receiving a label from a user for the first air chamber; presenting a prompt to the user on the display to enter a pressure setting for the first air chamber, the prompt including the label received from the user; receiving a pressure setting for the first air chamber from the user; and transmitting a control signal to instruct the first air chamber to adjust pressure to the pressure setting.

4 Claims, 12 Drawing Sheets

(56) References Cited

U.S. PATENT DOCUMENTS

| | | | |
|---|---|---|---|
| D691,118 S * | 10/2013 | Ingham et al. | D14/218 |
| D698,338 S * | 1/2014 | Ingham et al. | D14/218 |
| 8,651,585 B2 * | 2/2014 | Kaminski et al. | 303/7 |
| 2002/0010929 A1 * | 1/2002 | Collier | 725/40 |
| 2010/0170044 A1 * | 7/2010 | Kao et al. | 5/710 |
| 2011/0068932 A1 * | 3/2011 | Flocard et al. | 340/573.4 |
| 2012/0138067 A1 * | 6/2012 | Rawls-Meehan | 128/845 |
| 2013/0031725 A1 * | 2/2013 | Riley et al. | 5/713 |
| 2014/0007656 A1 * | 1/2014 | Mahoney | 73/49.3 |
| 2014/0059770 A1 * | 3/2014 | Williamson et al. | 5/617 |

* cited by examiner

SYSTEM AND METHOD FOR ADJUSTING SETTINGS OF A BED WITH A REMOTE CONTROL

CROSS-REFERENCE TO RELATED PATENT DOCUMENTS

This patent application claims the benefit of priority, under 35 U.S.C. §119(e), to U.S. Provisional Patent Application Ser. No. 61/785,397, titled SYSTEM AND METHOD FOR ADJUSTING SETTINGS OF A BED WITH A REMOTE CONTROL," filed on Mar. 14, 2013, which is incorporated by reference in its entirety.

TECHNICAL FIELD

This patent document pertains generally to remote control systems and more particularly, but not by way of limitation, to control of an inflatable air mattress system architecture.

BACKGROUND

In various examples, an air mattress control system allows a user to adjust the firmness or position of an air mattress bed. The mattress may have more than one zone thereby allowing a left and right side of the mattress to be adjusted to different firmness levels. Additionally, the bed may be adjustable to different positions. For example, the head section of the bed may be raised up while the foot section of the bed stays in place. In various examples, two separate remote controls are used to adjust the position and firmness, respectively.

BRIEF DESCRIPTION OF DRAWINGS

Some embodiments are illustrated by way of example and not limitation in the figures of the accompanying drawings in which:

FIG. 12 is a block diagram of machine in the example form of a computer system within which a set instructions, for causing the machine to perform any one or more of the methodologies discussed herein, may be executed.

DETAILED DESCRIPTION

Figure 1:
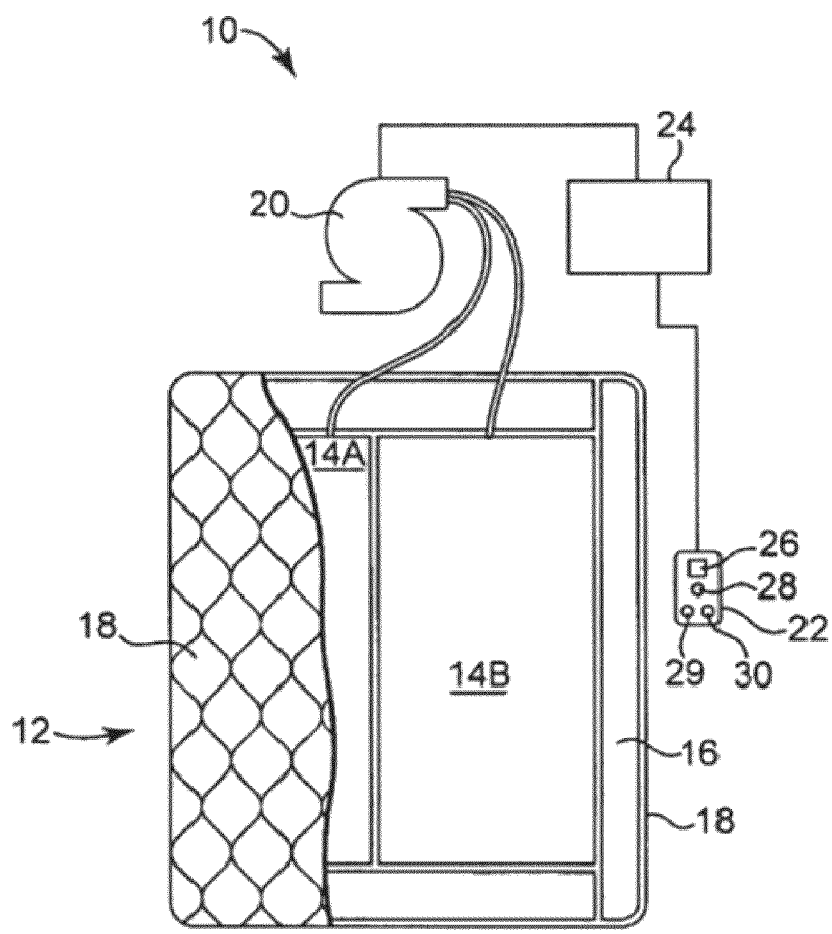
FIG. 1 is a diagrammatic representation of an air bed system, according to an example.

FIG. 1 is a diagrammatic representation of air bed system 10 in an example embodiment. System 10 may include bed 12, which may comprise at least one air chamber 14 surrounded by a resilient border 16 and encapsulated by bed ticking 18. The resilient border 16 may comprise any suitable material, such as foam.

As illustrated in FIG. 1, bed 12 may be a two chamber design having a first air chamber 14A and a second air chamber 14B. First and second air chambers 14A and 14B may be in fluid communication with pump 20. Pump 20 may be in electrical communication with a remote control 22 via control box 24. Remote control 22 may communicate via wired or wireless means with control box 24. Control box 24 may be configured to operate pump 20 to cause increases and decreases in the fluid pressure of first and second air chambers 14A and 14B based upon commands input by a user through remote control 22. Remote control 22 may include display 26, output selecting means 28, pressure increase button 29, and pressure decrease button 30. Output selecting means 28 may allow the user to switch the pump output between the first and second air chambers 14A and 14B, thus enabling control of multiple air chambers with a single remote control 22. For example, output selecting means may by a physical control (e.g., switch or button) or an input control displayed on display 26. Alternatively, separate remote control units may be provided for each air chamber and may each include the ability to control multiple air chambers. Pressure increase and decrease buttons 29 and 30 may allow a user to increase or decrease the pressure, respectively, in the air chamber selected with the output selecting means 28. Adjusting the pressure within the selected air chamber may cause a corresponding adjustment to the firmness of the air chamber.

Figure 2:
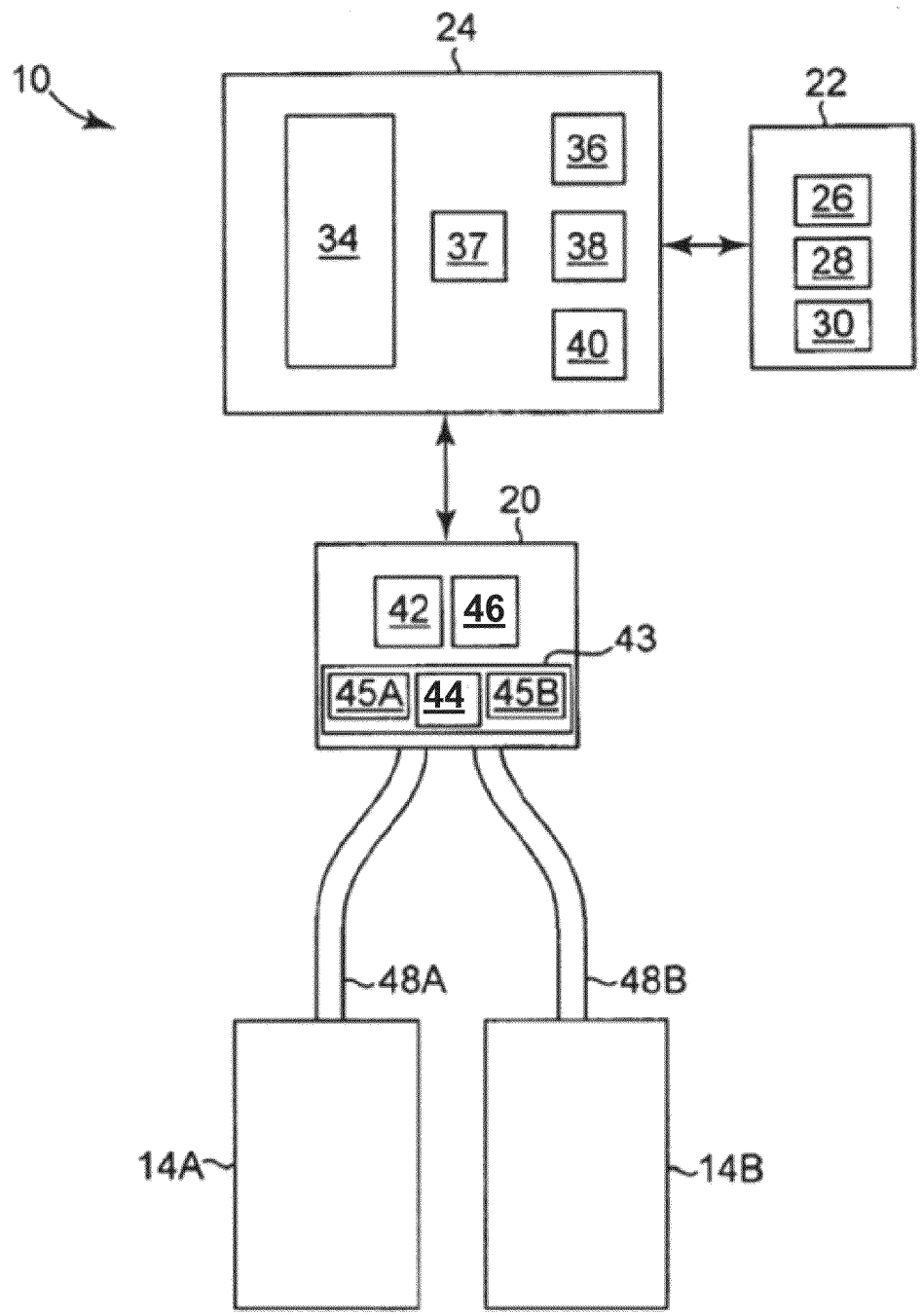
FIG. 2 is a block diagram of various components of the air bed system of FIG. 1, according to an example.

FIG. 2 is a block diagram detailing data communication between certain components of air bed system 10 according to various examples. As shown in FIG. 2, control box 24 may include power supply 34, processor 36, memory 37, switching means 38, and analog to digital (A/D) converter 40. Switching means 38 may be, for example, a relay or a solid state switch. Switching means 38 may be located in the pump 20 rather than the control box 24.

Pump 20 and remote control 22 may be in two-way communication with the control box 24. Pump 20 may include a motor 42, a pump manifold 43, a relief valve 44, a first control valve 45A, a second control valve 45B, and a pressure transducer 46, and may be fluidly connected with the first air chamber 14A and the second air chamber 14B via a first tube 48A and a second tube 48B, respectively. First and second control valves 45A and 45B may be controlled by switching means 38, and may be operable to regulate the flow of fluid between pump 20 and first and second air chambers 14A and 14B, respectively.

In an example, pump 20 and control box 24 may be provided and packaged as a single unit. Alternatively, pump 20 and control box 24 may be provided as physically separate units.

In operation, power supply 34 may receive power, such as 110 VAC power, from an external source and may convert the power to various forms required by certain components of the air bed system 10. Processor 36 may be used to control various logic sequences associated with operation of the air bed system 10, as will be discussed in further detail below.

The example of the air bed system 10 shown in FIG. 2 contemplates two air chambers 14A and 14B and a single pump 20. However, other examples may include an air bed system having two or more air chambers and one or more pumps incorporated into the air bed system to control the air chambers. In an example, a separate pump may be associated with each air chamber of the air bed system or a pump may be associated with multiple chambers of the air bed system. Separate pumps may allow each air chamber to be inflated or deflated independently and simultaneously. Furthermore, additional pressure transducers may also be incorporated into the air bed system such that, for example, a separate pressure transducer may be associated with each air chamber.

In the event that the processor 36 sends a decrease pressure command to one of air chambers 14A or 14B, switching means 38 may be used to convert the low voltage command signals sent by processor 36 to higher operating voltages sufficient to operate relief valve 44 of pump 20 and open control valves 45A or 45B. Opening relief valve 44 may allow air to escape from air chamber 14A or 14B through the respective air tube 48A or 48B. During deflation, pressure transducer 46 may send pressure readings to processor 36 via the A/D converter 40. The A/D converter 40 may receive analog information from pressure transducer 46 and may convert the analog information to digital information useable by processor 36. Processor 36 may send the digital signal to remote control 22 to update display 26 on the remote control in order to convey the pressure information to the user.

In the event that processor 36 sends an increase pressure command, pump motor 42 may be energized, sending air to the designated air chamber through air tube 48A or 48B via electronically operating corresponding valve 45A or 45B. While air is being delivered to the designated air chamber in order to increase the firmness of the chamber, pressure transducer 46 may sense pressure within pump manifold 43. Again, pressure transducer 46 may send pressure readings to processor 36 via A/D converter 40. Processor 36 may use the information received from A/D converter 40 to determine the difference between the actual pressure in air chamber 14A or 14B and the desired pressure. Processor 36 may send the digital signal to remote control 22 to update display 26 on the remote control in order to convey the pressure information to the user.

Generally speaking, during an inflation or deflation process, the pressure sensed within pump manifold 43 provides an approximation of the pressure within the air chamber. An example method of obtaining a pump manifold pressure reading that is substantially equivalent to the actual pressure within an air chamber is to turn off pump 20, allow the pressure within the air chamber 14A or 14B and pump manifold 43 to equalize, and then sense the pressure within pump manifold 43 with pressure transducer 46. Thus, providing a sufficient amount of time to allow the pressures within pump manifold 43 and chamber 14A or 14B to equalize may result in pressure readings that are accurate approximations of the actual pressure within air chamber 14A or 14B. In various examples, the pressure of 48A/B is continuously monitored using multiple pressure sensors.

In an example, another method of obtaining a pump manifold pressure reading that is substantially equivalent to the actual pressure within an air chamber is through the use of a pressure adjustment algorithm. In general, the method may function by approximating the air chamber pressure based upon a mathematical relationship between the air chamber pressure and the pressure measured within pump manifold 43 (during both an inflation cycle and a deflation cycle), thereby eliminating the need to turn off pump 20 in order to obtain a substantially accurate approximation of the air chamber pressure. As a result, a desired pressure setpoint within air chamber 14A or 14B may be achieved without the need for turning pump 20 off to allow the pressures to equalize. The latter method of approximating an air chamber pressure using mathematical relationships between the air chamber pressure and the pump manifold pressure is described in detail in U.S. application Ser. No. 12/936,084, the entirety of which is incorporated herein by reference.

Figure 3A:
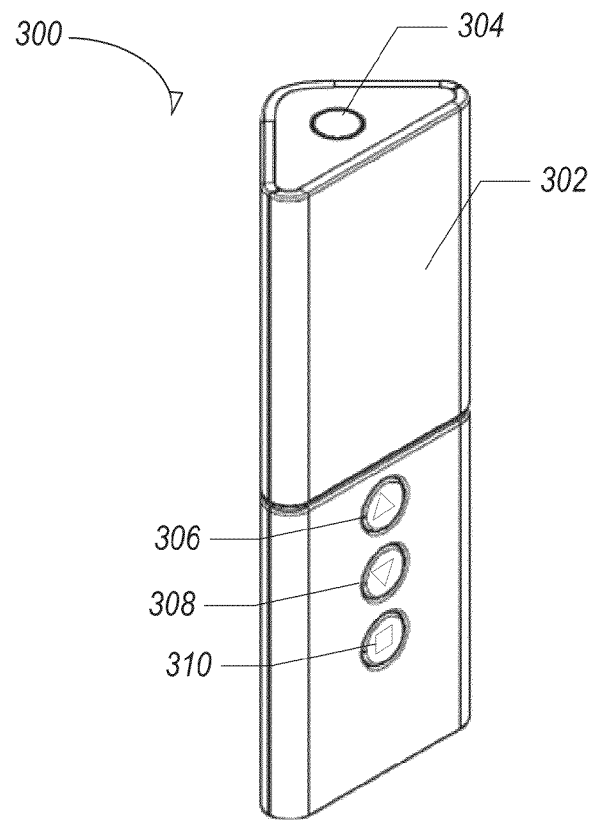
FIGS. 3A and 3B are illustrations of an example remote control, according to example.
Figure 3B:
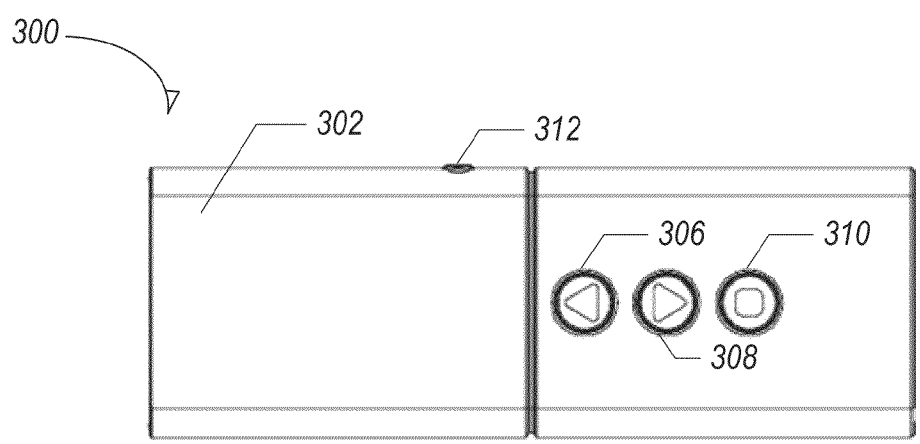

FIGS. 3A and 3B illustrate two different view of an example remote control 300. Remote control 300 may be used with an air bed system such as described in FIG. 1 and FIG. 2. In an example, remote control 300 is configured to include at least the same functionality as described with respect to remote control 22 (e.g., transmitting commands to raise and lower pressure in an air chamber). In an example, remote control 300 includes display 302, and buttons 304, 306, 308, 310, and 312. For labeling purposes and not by way of limitations, buttons 304-312 are discussed as top-button 304, up-button 306, down-button 308, menu button 310, and side-button 312. In various example, remote control 300 may be configured such that the functionality attributed to a particular button 304-312 as discussed herein may be assigned to a different button. In various examples, one or more of buttons 304-312 include backlighting. For example, light emitting diodes (LEDs) may be used to illuminate buttons 306-310.

In an example, display 302 is a TFT matrix display, however, other types of displays may be used. Additionally, display 302 may be a resistive or capacitive touch screen configured to provide an additional input mechanism beyond buttons 304-312 or be used in place of buttons 304-312. In a further example, remote control 300 includes fewer buttons than the five illustrated in FIG. 3. For example, a user may have an air bed system that does not have multiple air chambers and therefore may not need side-button 312 to switch between air chambers. In yet further examples, a combination of touch screen inputs and physical buttons may be used.

In various examples, remote control 300 includes a network interface to communicate with one or more components of an air bed system (e.g., pump 24). The network interface may include a transmitter to communicate over one or more network protocols such as, but not limited to, 802.11, 802.15.4, Bluetooth, and cellular protocols (e.g., 4G LTE). Remote control 300 may further include at least one processor to execute instructions stored on a storage device of remote control 300. Upon execution of the instruction, the at least one processor may be configured to perform the operations described here. While described as a standalone remote, instructions for performing the features described herein may be stored as an application and executed on other devices such mobile phones, tablets, or personal computers.

In various examples, remote control 300 does not include a power button to turn the remote on and off. Remote control 300 may "wake up" (i.e., activate) when a user touches the remote after which display 302 may be turned on. Remote control 300 may sense a touch using one or more sensors such as an accelerometer or a user depressing one or more of buttons 304-312. In an example, remote control 300 is configured to distinguish between a bump in which the remote control does not move and picking up the remote (e.g., profiles of acidometer data may be stored for the different type of events). In an example, the display does not turn on if the accelerometer data indicates remote control 300 has been bumped.

If no user interaction is detected after a predetermined delay period (e.g., 10 seconds) the remote may be back into a sleep state with the display off. The amount of time before remote control 300 goes to sleep may be set according to a user preference. For example, remote control 300 may display a prompt requesting the user to enter in the delay period using up/down-buttons 306 and 308. Remote control 300 may store the entered time and use it to determine when to go to sleep.

In various examples, a remote control comes with an air bed system and thus is preprogramed to communicate with a specific air bed system. Additionally, certain functionality of remote control 300 may use certain components that are not present in all air bed systems. Consequently, such feature may be hidden or disabled in certain remote controls. For example, if an air bed system includes a single air chamber, the functionality of naming two sides of a bed may not be enabled on the remote control.

In various examples, remote control 300 is configured to present user interfaces associated with a variety of features of an air bed system. For example, there may be a full-fill feature, a refresh feature, set favorite pressure feature, recall favorite pressure feature, and a find a pressure setting feature.

These features may be activated in a variety of manner using remote control 300 as discussed further herein.

FIGS. 4-11 illustrate example user interface flows that may be displayed on display 302. The flows represent various paths a user may take to utilize the features of the air bed system. While the flows illustrate a specific order of operations, other orders may be used. Additionally, the various symbols in the flows may refer to buttons of remote control 300. For example, with reference to FIG. 4, symbol 404 may refer to up-button 306, symbol 406 may refer to down-button 308, and symbol 408 may refer to menu button 310. As indicated previously, instructions stored on remote control 300 may allow the functionality attributed to one button may be used with a different button without departing from the scope of this disclosure. Furthermore, the below descriptions often discuss a selected side of the bed, however, the features may be used with a single air chamber where no side need be selected.

Figure 4:
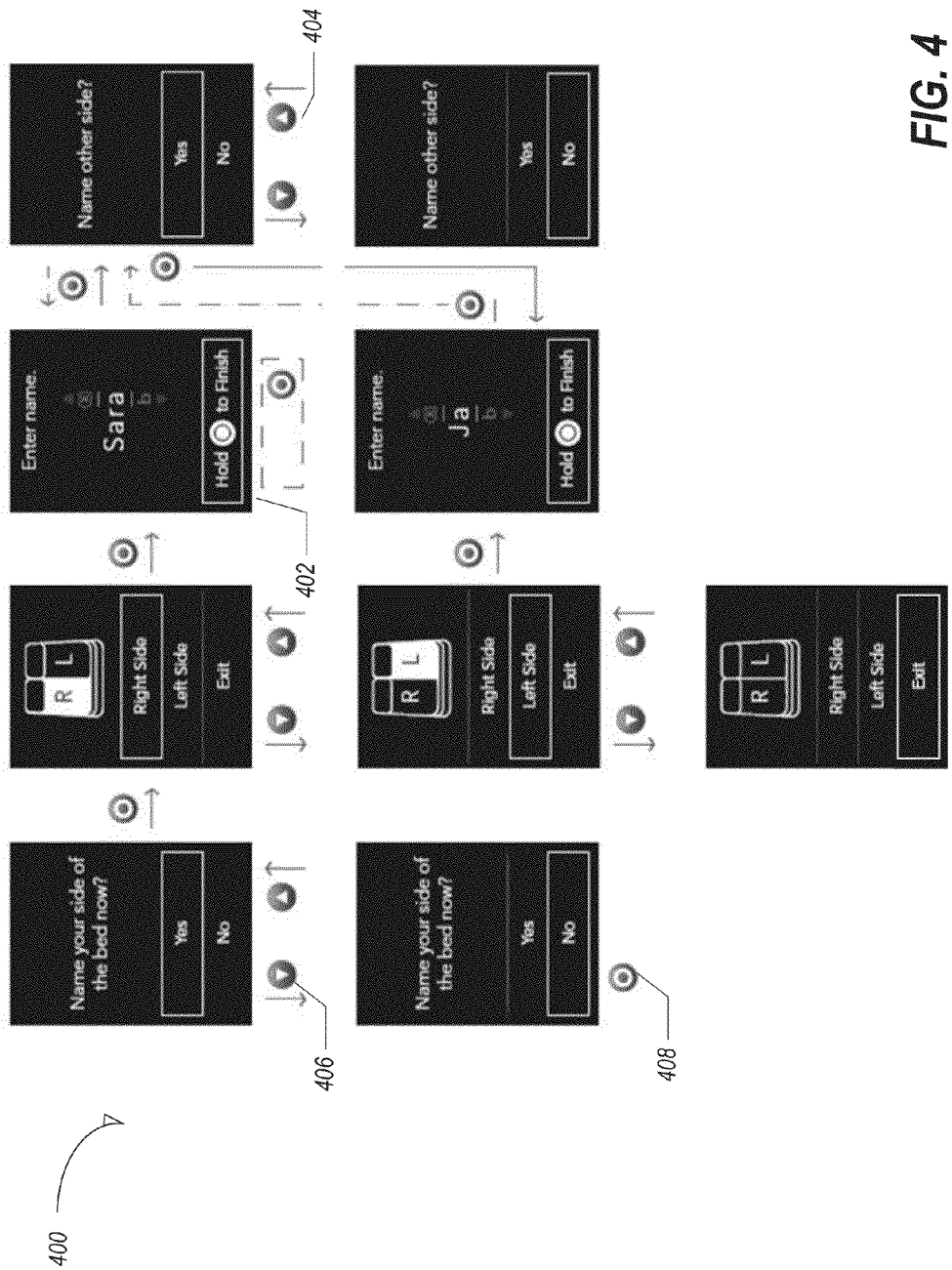
FIGS. 4-12 illustrate various user interface flows, according to various examples.

FIG. 4 illustrates an example user interface flow 400 that may be displayed on display 302 of remote control to name one or more sides of an air bed system. In an example, flow 400 is shown to a user the first time the remote control is used by a user. After a user completes or bypasses flow 400, remote control 300 may store an indication that flow 400 has been presented to a user. Thus, the next time remote control 300 is activated, flow 400 is not presented to the user. The indication may be stored in volatile storage such that even if the batteries are replaced, flow 400 is not presented to the user upon activating the remote; however, parts of flow 400 may be shown again if manually selected by a user in a settings menu (see e.g., FIG. 7).

As illustrated, flow 400 includes an example path a user may take to name a left and right side of an air bed system. In an example, a user is presented with instructions to use the up and down buttons to move through the available naming characters (e.g., a-z, A-Z) and press menu-button 310 to select a letter. In an example, after a name has been entered, remote control 300 prompts the user to use the name or enter a new name. Upon receiving selections of a name(s) and/or confirmation from a user (402), the names may be stored in a stored in a storage device of remote control 300. If a user does not name one or more of the sides, default names of "left" and "right" may be used. Remote control 300 may use the stored names when referring to specific settings or when greeting a user (see e.g., FIG. 5).

In an example, remote control 300 initially displays instructions to connect various components of the air bed system before flow 400 is presented. Additionally, after a user has indicated he/she has connected the components, remote control 300 may transmit a signal to a connected component to determine if the component is working according to predetermined levels and is property connected. If an error is detected, (e.g., no response is received from the component or the response is not within an acceptable range) remote control 300 may display a message to the user instructing the user to attempt to connect the component again. If the error persists, a message may be displayed instructing the user to call a customer service phone line or direct the user to a website for further assistance. In an example, remote control 300 waits until receiving a confirmation signal that the connected components are ready for use before presenting additional instructions to the user. In an example, status message are presented on the screen while the components are being configured (e.g., "Technology is engaging," "This may take a few minutes").

Figure 5:
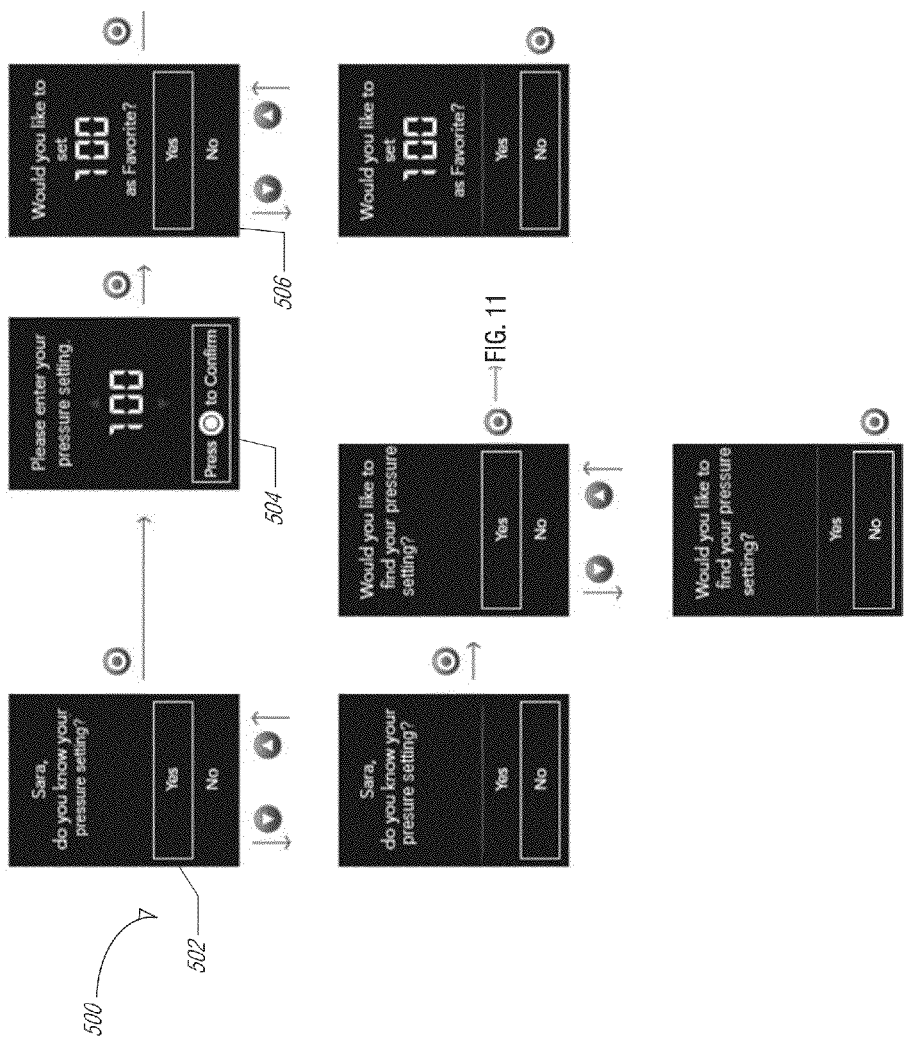

FIG. 5 illustrates an example user interface flow 500 that may be displayed on display 302 of remote control to establish a pressure setting for one or more users of an air bed system. As illustrated, a user may be prompted with an initial question asking if he or she knows their pressure setting. The prompt may be associated with one of the sides of the bed and use a name associated with the side of the bed. For example, the name "Sara" was stored in remote control 300 as associated with the left side of the bed and therefore the prompt uses "Sara" in the request for setting a pressure setting. The prompt may be dynamically created by retrieving the name from the storage device of remote control 300.

If the user does know his/her pressure setting (502), the user may select "yes" through depression of menu button 310. Another prompt may then be presented to the user for entry of the pressure setting. The user may use up/down-buttons 306 and 308 to enter a pressure setting (504) and be given a further prompt requesting whether or not to use the pressure setting as a favorite (506). In an example, remote control 300 stores the pressure setting entered by the user as associated with a particular side of the bed (e.g., the left side or Sara's side). If the user selected the "yes" option for setting the pressure as a favorite, remote control 300 may further store an indication that the pressure setting is a favorite for that side of the bed. In an example, the favorite question is omitted, but the number is stored as a favorite for that side of the bed. In various examples, the process may be repeated for the second side of the bed when there are two sides of the air bed system. If the user does not know which pressure setting to use, remote control 300 may help guide the user to determine a comfortable pressure setting to use for the user (see FIG. 11).

After a user has been given the option to name the sides of the bed and enter initial pressure settings, remote control 300 may considered to be in a set up state. In other words, the next time the remote is activated (e.g., picked up), instead of the flows of FIGS. 4 and 5 being displayed, remote control 300 may present a screen that includes the name of a side of the bed. After a delay period (e.g., one second), the screen may change to a default screen that presents the name of the other side of the bed. In an example, remote control 300 begins in a set up state with no names for the sides of the bed or pressure settings. In various example, instead of the screen going off after a delay period, remote control 300 may use the default screen. Furthermore, the default screen may be presented in a dimmed state after a period of non-use by a user. In an example, the display does not switch between the sides, but instead displays the name of whichever side the user was interacting with before the remote last went to sleep. A user may switch between the sides by depressing the side button, for example.

Figure 6:
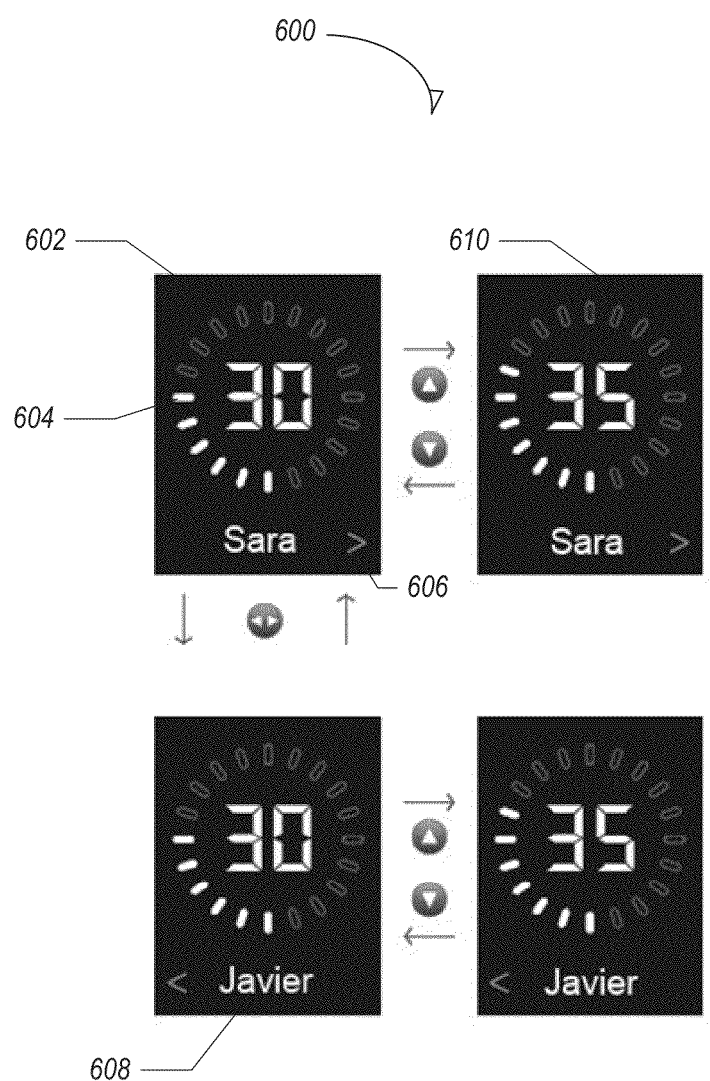

FIG. 6 illustrates an example user interface flow 600 to adjust the current pressure of a side of an air bed system. The flow may begin after receiving a button depression from a user when remote control 300 is displaying the default screen or when the remote is picked up. Depending on which name is displayed on the display when the button depression occurs, remote control 300 may display a different screen. For example, if "Sara" is displayed when the button is depressed, screen 602 may be displayed, whereas if "Javier" is being displayed, screen 608 may be displayed. A user may switch between the sides of the bed by depressing side-button 312.

In an example, a number is displayed on remote control 300 that is the current pressure setting for the side of the bed selected by the user. The current pressure may be stored on remote control 300 or remote control 300 may transmit a request to control box 24 to determine the current pressure of the selected side of the air bed system. As illustrated, screen 602 provides visual indicators 604 as to the pressure setting. For example, screen 604 has 20 dashes representing 20 different pressure settings from 0-100 in multiple of five. Because the current setting is 30, six dashes are filled in. Also, in addition to the name given to the side, Sara, arrow 606 may be displayed indicating the settings is for the right side of the bed.

A user may adjust the current pressure setting by using up/down-buttons 306 and 308. Remote control 300 may update the screen to provide an indication of the user's button depressions. For example, a user may depress up-button 306 to increase the pressure to 35 and screen 610 may be displayed. As illustrated, another dash has been filled in and the number has been updated to 35. After a user has adjusted the pressure setting, an adjustment signal may be transmitted to control box 24 from remote control 300 with an instruction to increase or decrease the pressure of the side of the bed as selected by the user.

In an example, remote control 300 has a delay period before transmitting the adjustment signal. For example, remote control 300 may wait three seconds to determine if the user is making additional adjustments. After the adjustment signal has been sent, remote control 300 may provide visual indications that an adjustment is being made. For example, if a user selects a new setting of 60 from a setting of 30, the dash mark representing 60 may be blink. Additionally, as the adjustment is being made the dash marks between the current setting and new setting may fill in as the bed inflates. Conversely, if the bed is being deflated the dash marks may become unfilled as the pressure decreases. Other symbol indicators and colors beyond black and white dash marks may also be used without departing from the scope of this disclosure. In an example, a user may initiate the adjustment before the three second delay by pressing menu button 310; however, if the user presses menu button 310 after the delay period, the user may be taken to a menu screen (e.g., screen 702).

Figure 7:
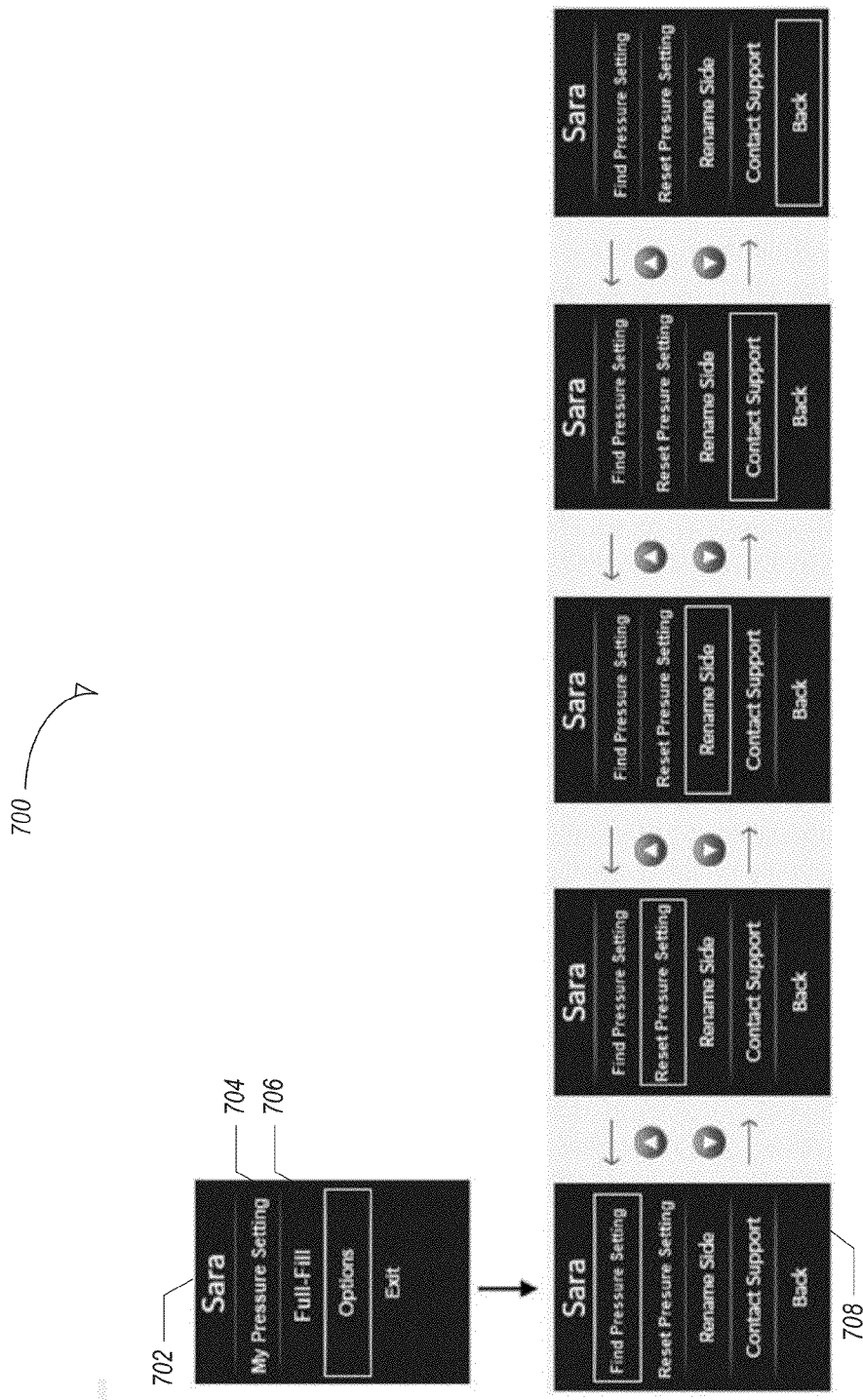

In various examples, a user may access a menu that enables a user to activate various features of the air bed system as well as change a variety of settings. FIG. 7 illustrates an example flow 700 for selecting features and settings of remote control 300. Screen 702 may be accessed by a user depressing menu button 310 after remote control 300 is activated. Depending on which side is active (e.g., which side a user was interacting with previously) when menu button 310 is pressed, a different name may appear on screen 702 similar to flow 600. A user may switch between two sides of the bed by depressing side-button 312.

As illustrated, screen 702 include menu items for activating a stored pressure setting ("My Pressure Setting favorite"), a full fill feature, and options for additional settings. If a user has not set a favorite for an the selected side, an option may be presented to set a favorite as opposed to displaying "My Favorite." A user may use the up and down-buttons to select an item from the menu and press menu key 310 to activate the item. In various examples, activating "My Pressure Setting" causes remote control 300 to enter flow 800 with reference to FIG. 8; activating "Full-Fill" causes remote control 300 to enter flow 900 with reference to FIG. 9; and activating "Options" causes remote control 300 to display screen 708.

In an example, when a user selects and activates "Options" from screen 702, screen 708 is presented to the user. Screen 708 illustrates example settings that may be available to a user and activatable (e.g., using up and down buttons to select an option and pressing the menu button to activate). The option "Find Pressure Setting" may take the user to flow 1100. The option "Reset Pressure Setting" may allow a user to set a new favorite pressure setting (see e.g., FIG. 5). When a user selects and activates "Rename Side" a screen such as 402 with reference to FIG. 4 may be presented. If a new name is selected, remote control 300 may store the new name and associate it with the current side (e.g., the right side in example flow 700). Selecting and activating contact support may present a screen with a number or e-mail address to contact.

In various examples, other options may be presented to the user. For example, a "Sync Remote" option may present a flow to the user to sync the remote with an air bed system. For example, if remote control 300 does not come pre-synced or if the remote is to be switched to an new air bed system, instructions may be provided to the user on how to accomplish the sync.

Figure 8:
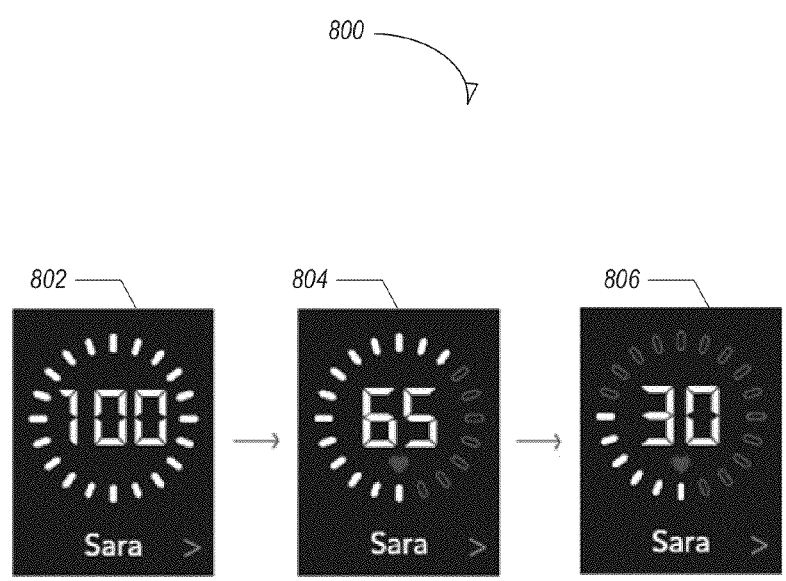

FIG. 8 illustrates an example flow 800 for using a favorite pressure setting. A user may be presented with screen 802 when accessing the "My Favorite" menu item or depressing top-button 304. Screen 802 illustrates the current pressure setting of the selected side of the bed. A user may then hold down menu button 310 for a predetermined amount of time (e.g., two seconds) to change the current pressure setting to the favorite pressure setting. In an example, a user may also activate the user's stored favorite pressure by pressing and holding a button. In an embodiment, remote control 300 begins to adjust the setting to the favorite setting with no further input from the user.

In an example, remote control 300 may access the stored favorite pressure setting of a user and transmit a signal to control box 24 to change the pressure of an air chamber. A visual indicator (e.g., a heart in screen 804 or a star) may be presented to a user to indicate to the user that the pressure is being changed to the favorite setting. In an example, the dashes illustrated change while the pressure is changing similar as described with respect to FIG. 6. When the pressure has reached the favorite pressure setting, a screen such as screen 806 may be displayed.

In various examples, a user may change his or her favorite pressure setting while in flow 800. For example, a user may use the up/down-buttons at screen 802 to change the pressure setting on screen 802. A prompt may then be presented to the user asking if the user would like to store the pressure setting as a favorite.

Figure 9:
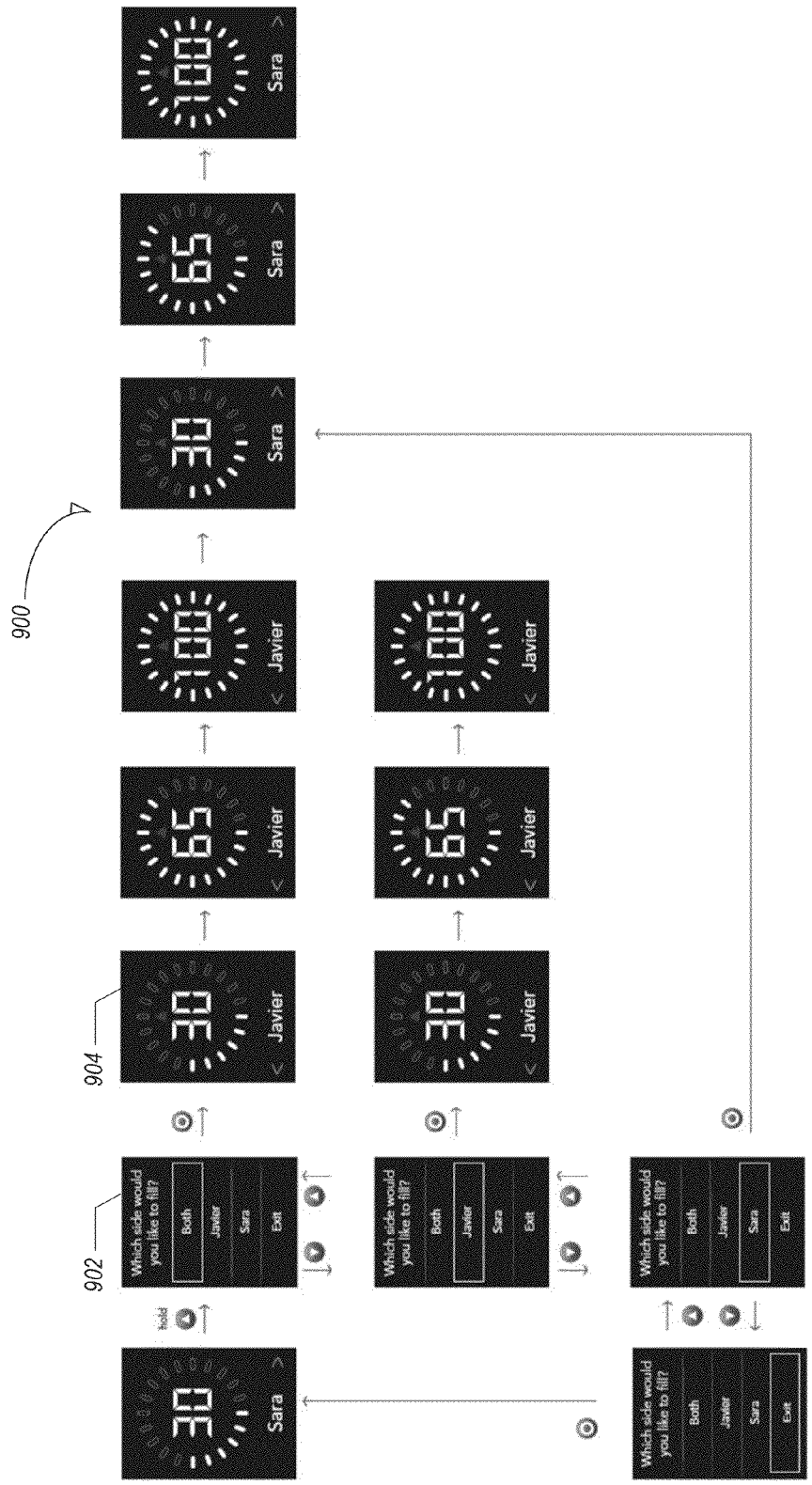

FIG. 9 illustrates an example flow 900 for using a full fill feature of an air bed system. In an example, a user may want to temporarily increase the pressure of an air bed to its highest level. For example, increasing the pressure in an air chamber may make the bed have a nicer appearance when not in use. In various examples, the full feature may be accessed through a menu screen such as in FIG. 7 or by holding up-button 306.

In an example, a prompt may be presented such as 902 requesting which side(s) of the bed to use the full fill feature. Upon receiving indication of a selection of a side(s) by a user, remote control 300 may transmit a control signal to control box 24 to increase the pressure in one or more air chambers. While the pressure is being increased a visual indicator (e.g., an up arrow in screen 904) may be presented to a user. Additionally, while the pressure is changing, the dashes presented to a user may change as described with reference to FIG. 6.

Figure 10:
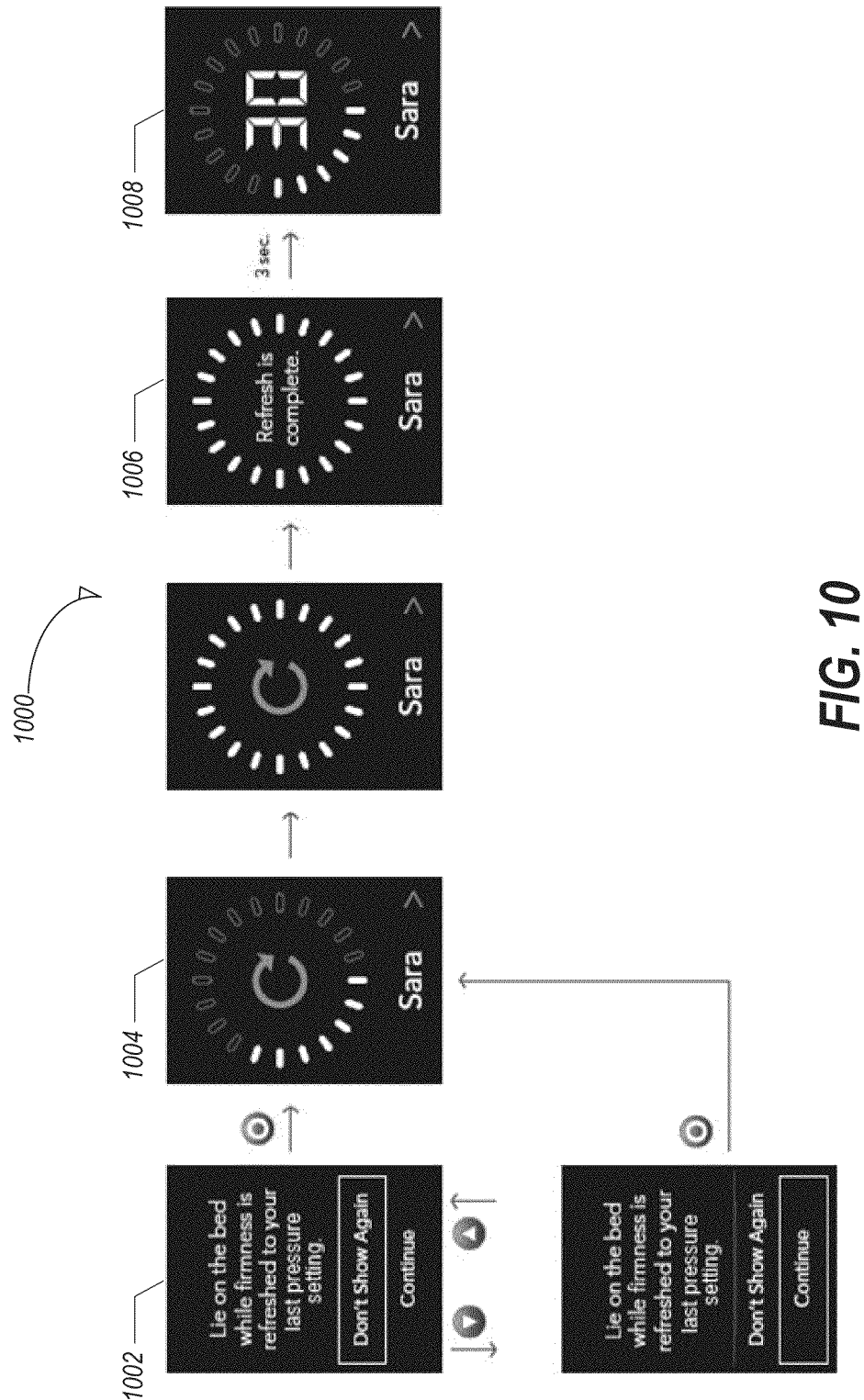

FIG. 10 illustrates an example flow 1000 for a using a refresh feature of an air bed system. In an example, a refresh is used due to environmental changes surrounding the air bed system. For example, a temperature change can change the pressure of an air chamber even though a user has not changed the pressure setting. Accordingly, a user may wish to recalibrate the mattress to the pressure corresponding to his or her set pressure setting. In various examples, the refresh feature is activated by the air bed system. For example, control box 24, remote control 300, or pump 22 may periodically check (e.g., once an hour) if the pressure in an air chamber matches the user's pressure setting. If there is a difference outside of a preset range (e.g., 2 PSI) flow 1000 may be presented to a user. In various examples, the refresh feature may be activated by the user through a menu selection of preset button depression such holding top-button 304 for a certain period (e.g., two seconds).

As illustrated in screen 1002, a user may be instructed to lie on the bed while the refresh occurs. Screen 1004 may be displayed to a user while the refresh occurs with an indication of the progress of the refresh using dashed indicators. Screen 1006 may be displayed to a user when the refresh is complete. After a delay such as three seconds, a screen such as 1008 may be presented that includes the current pressure setting of a selected side of the air bed system.

Figure 11:
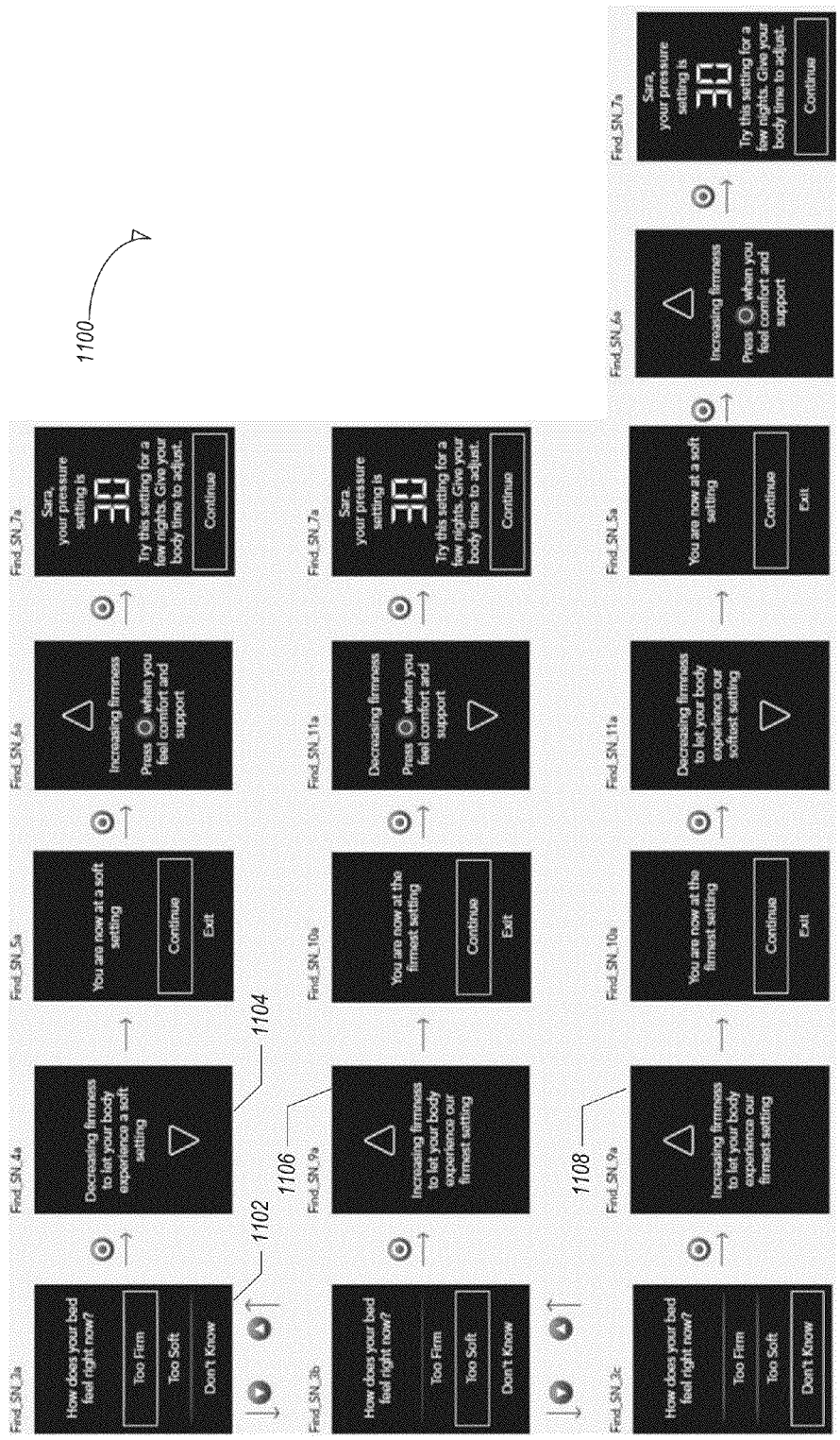

FIG. 11 illustrates an example flow 1100 to help a user find a desirable pressure setting. Flow 1100 may be displayed during the initial set up process if activated by a user or may be displayed by activating the feature through a menu. In an example, a screen not shown in FIG. 11, first instructs the user to lie down on the bed. Then a screen such 1102 may be presented to a user asking them how the bed feels.

Depending on what answer is selected and activated by the user, screen 1104, 1106, or 1108, may be presented. Similarly, depending on the selection, a different process may be used to help the user find a comfortable pressure setting. For example, if the user answer "Don't know," a signal may be transmitted to the bed to increase the pressure to its highest setting, then after the user continues, decreases the pressure bed of the bed to its softness setting. Then, the bed may slowing increase in pressure (e.g., in 5 unit increments) until a user presses a button (e.g., menu button 310) to stop the increase. Accordingly, whatever pressure setting the bed was at when the button was pressed may be presented to the user.

In an example, if the user selects and activates "Too Firm" the bed may be decreased to its softness setting and may slowly increase until the user presses a button (e.g., menu button 310). Alternatively, if the user selects and activates "Too Soft" the bed may be increased to its firmest setting and may slowly decrease until the user presses a button (e.g., menu button 310)

In various examples, remote control 300 maintains a log of previous pressure settings and how many pressure settings have been used over a period of time. If a user switches firmness settings more than a set number of times over a certain period (e.g., seven times in seven days), remote control 300 may present a prompt screen to a user asking them if the user is sleeping comfortably. For example, when a user sets a new pressure setting, remote control 300 may determine if the user has reached the threshold and present the prompt. If the user indicates he or she is sleeping comfortably, the default screen may be presented to the user. However, if the user indicates he or she is sleeping uncomfortably (e.g., selecting a "No" option), the user may be prompted to find a new firmness setting and if the user answers affirmatively (e.g., answers that the user would like to find a new firmness setting), the user may enter flow 1100.

Example Machine Architecture and Machine-Readable Medium

Figure 12:
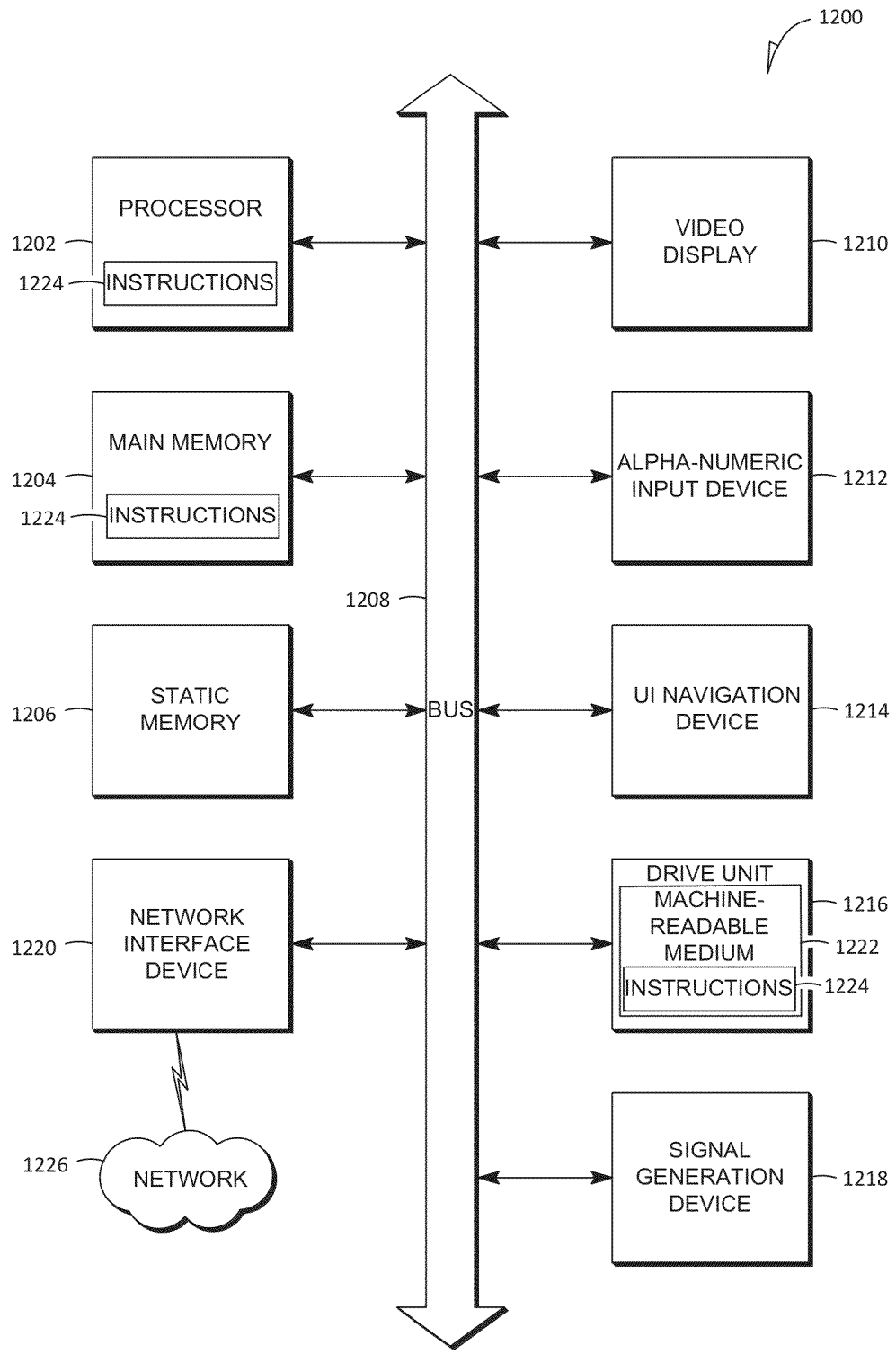

FIG. 12 is a block diagram of machine in the example form of a computer system 1200 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1200 includes a processor 1202 (e.g., a central processing unit (CPU), a graphics processing unit (GPU), ASIC or a combination), a main memory 1204 and a static memory 1206, which communicate with each other via a bus 1208. The computer system 1200 may further include a video display unit 1210 (e.g., a liquid crystal display (LCD) or a cathode ray tube (CRT)). The computer system 1200 also includes an alphanumeric input device 1212 (e.g., a keyboard, touchscreen), a user interface (UI) navigation device 1214 (e.g., a mouse), a disk drive unit 1216, a signal generation device 1218 (e.g., a speaker) and a network interface device 1220.

Machine-Readable Medium

The disk drive unit 1216 includes a machine-readable medium 1222 on which is stored one or more sets of instructions and data structures (e.g., software) 1224 embodying or utilized by any one or more of the methodologies or functions described herein. The instructions 1224 may also reside, completely or at least partially, within the main memory 1204 and/or within the processor 1202 during execution thereof by the computer system 1200, the main memory 1204 and the processor 1202 also constituting machine-readable media.

While the machine-readable medium 1222 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 1224 may further be transmitted or received over a communications network 1226 using a transmission medium. The instructions 1224 may be transmitted using the network interface device 1220 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled. As it common, the terms "a" and "an" may refer to one or more unless otherwise indicated.

What is claimed is:

1. A method for controlling pressure settings in an air mattress having a plurality of air chambers including a first air chamber and a second air chamber, the method comprising:
    executing, by at least one processor, the steps of:
    presenting a user interface on a display of a remote control to label the first air chamber of the plurality of air chambers;
    receiving a label from a user for the first air chamber;
    presenting a prompt to the user on the display to enter a pressure setting for the first air chamber, the prompt including the label received from the user;
    receiving a pressure setting for the first air chamber from the user;
    transmitting a control signal to instruct the first air chamber to adjust pressure to the pressure setting for the first air chamber;
    presenting a user interface on the display of the remote control to label the second air chamber;
    receiving a label from the user for the second air chamber;
    presenting a prompt to the user on the display to enter a pressure setting for the second air chamber, the prompt including the label received from the user for the second air chamber;
    receiving a pressure setting for the second air chamber from the user;
    transmitting a control signal to instruct the second air chamber to adjust pressure to the pressure setting for the second air chamber;
    presenting a first message on the display, the first message including the label for the first air chamber; and
    thereafter detecting user activity on the remote control, determining whether the user activity occurred when the first message was presented on the display, and if said user activity occurred when the first message was presented on the display, retrieving a current pressure setting for the first air chamber and presenting the current pressure setting for the first air chamber on the display.

2. The method of claim 1, wherein the at least one processor further performs the step of:
    removing, after a predetermined period of time, the first message and thereafter presenting a second message on the display, the second message including the label for the second air chamber.

3. The method of claim 1, wherein the at least one processor further performs the step of:
    receiving an indication from an accelerometer of the remote control that the remote control has moved prior to presenting the first message.

4. The method of claim 1, wherein the at least one processor further performs the steps of:
    receiving an indication that a button has been depressed on the remote control; and
    based on receiving the indication:
        retrieving a current pressure setting for the second air chamber; and
        presenting the current pressure setting for the second air chamber.

* * * * *

UNITED STATES PATENT AND TRADEMARK OFFICE
CERTIFICATE OF CORRECTION

| | | |
|---|---|---|
| PATENT NO. | : 8,893,339 B2 | Page 1 of 1 |
| APPLICATION NO. | : 14/206892 | |
| DATED | : November 25, 2014 | |
| INVENTOR(S) | : Joe Fleury et al. | |

It is certified that error appears in the above-identified patent and that said Letters Patent is hereby corrected as shown below:

On the title page, Item (71) Applicants: delete "Joe Fleury, Woodbury, MN (US); Mark Dickens, Franklin, TN (US)" and insert -- SELECT COMFORT CORPORATION, Minneapolis, MN (US) --.

Signed and Sealed this
Seventeenth Day of March, 2015

Michelle K. Lee
*Director of the United States Patent and Trademark Office*